(12) United States Patent
Hägglund et al.

(10) Patent No.: US 7,013,846 B2
(45) Date of Patent: Mar. 21, 2006

(54) ARRANGEMENT AND METHOD IN CONNECTION WITH DIESEL ENGINE

(75) Inventors: Thomas Hägglund, Sundom (FI); Harry Holmgren, Malax (FI)

(73) Assignee: Wartsila Finland Oy, Vaasa (FI)

( * ) Notice: Subject to any disclaimer, the term of this patent is extended or adjusted under 35 U.S.C. 154(b) by 0 days.

(21) Appl. No.: 10/490,684

(22) PCT Filed: Oct. 1, 2002

(86) PCT No.: PCT/FI02/00776

§ 371 (c)(1),
(2), (4) Date: Mar. 24, 2004

(87) PCT Pub. No.: WO03/031795

PCT Pub. Date: Apr. 17, 2003

(65) Prior Publication Data

US 2004/0244734 A1  Dec. 9, 2004

(30) Foreign Application Priority Data

Oct. 9, 2001 (FI) .................................. 20011965

(51) Int. Cl.
*F02B 47/00* (2006.01)
(52) U.S. Cl. .................. 123/25 B; 123/25 D
(58) Field of Classification Search ............. 123/25 B, 123/25 D, 25 F, 25 P, 250, 252
See application file for complete search history.

(56) References Cited

U.S. PATENT DOCUMENTS

| 4,030,456 | A | | 6/1977 | Corpus | |
|---|---|---|---|---|---|
| 5,125,377 | A | * | 6/1992 | Mezheritsky | ........... 123/198 A |
| 5,609,029 | A | | 3/1997 | Ahnger et al. | |
| 5,758,606 | A | * | 6/1998 | Rosen et al. | .............. 123/25 B |
| 5,797,265 | A | | 8/1998 | Hägglund | |
| 6,145,497 | A | * | 11/2000 | Kervagoret et al. | ........ 123/563 |
| 6,196,165 | B1 | * | 3/2001 | Rosen et al. | .............. 123/25 B |

FOREIGN PATENT DOCUMENTS

| DE | 33 33 069 | 3/1985 |
|---|---|---|
| DE | 34 39 444 | 4/1986 |
| EP | 1 076 169 | 2/2001 |
| WO | 02/075141 | 9/2002 |

* cited by examiner

*Primary Examiner*—Mahmoud Gimie
(74) *Attorney, Agent, or Firm*—Smith-Hill and Bedell

(57) ABSTRACT

Arrangement in connection with a diesel engine comprising an air supply system for the diesel engine for supplying suction air to the engine from the environment, the air supply system comprising at least a channel arrangement, a compressor and a heat exchanger for suction air and a cooling circuit for the diesel engine, to which circuit at least one heat exchanger is connected. The heat exchanger connected to the cooling circuit, which recovers waste heat from the diesel engine, is arranged to evaporate water by the heat received from the cooling circuit. The invention also relates to a corresponding method.

12 Claims, 1 Drawing Sheet

US 7,013,846 B2

ARRANGEMENT AND METHOD IN CONNECTION WITH DIESEL ENGINE

CROSS REFERENCE TO RELATED APPLICATION

This is a national stage application filed under 35 USC 371 based on International Application No. PCT/FI2002/000776 filed Oct. 1, 2002, and claims priority under 35 USC 119 of Finnish Patent Application No. 20011965 filed Oct. 9, 2001.

BACKGROUND OF THE INVENTION

The present invention relates to an arrangement and a method in connection with a diesel engine.

As it is generally known, the use of a diesel engine may produce a considerable amount of nitrogen oxide emissions. Various methods have been developed to reduce the emissions, such as selective catalytic reduction systems, water injection directly into combustion chamber, moistening of suction air with steam or water. All the prior art approaches require high investments and are technically relatively complicated.

The object of the present invention is to provide an arrangement and a method minimizing the prior art problems. Especially an object of the present invention is to provide an arrangement and a method, by which the nitrogen emissions from a pressure charged diesel engine could be reduced simply and effectively.

SUMMARY OF THE INVENTION

The arrangement according to the invention in connection with a diesel engine comprises an air supply system for supplying suction air to the engine from the environment. The air supply system further comprises at least a channel arrangement, a compressor and a heat exchanger for suction air. The arrangement also comprises a cooling circuit recovering waste heat from the diesel engine, to which circuit at least one heat exchanger is connected. The heat exchanger connected to the cooling circuit is arranged to evaporate water by the heat received from the cooling circuit. In addition, the heat exchanger is connected via a steam feed channel to the channel arrangement of the air supply system. The steam feed channel is arranged to connect the channel arrangement to the heat exchanger, whereby produced steam can be conducted to the suction air of the engine.

Preferably, the steam feed channel is arranged so that the pressure prevailing in the channel arrangement can affect the pressure prevailing in the heat exchanger, whereby the evaporation pressure is reduced thus reducing also the boiling point. In a case like this the required temperature level in the cooling circuit is lower than it would be at a higher evaporation pressure. Preferably, the cooling circuit recovering waste heat from the diesel engine is a cooling circuit of a diesel engine block and/or of a cylinder head, which operates at higher temperature level, whereby also the evaporation temperature becomes relatively high.

Preferably, the heat exchanger is connected to the cooling circuit of the engine so that the steam feed channel joins the channel arrangement in the flow direction of the suction air before the compressor. The flow channel of the cooling circuit branches off to form two separate channels, of which the first one passes by the heat exchanger and the second one goes via the heat exchanger. The cooling circuit is after the heat exchanger connected in the flow direction of the coolant to a heat exchanger for suction air provided in the air supply system.

In the method in connection with a diesel engine comprising an air supply system for the diesel engine, which air supply system comprises at least a channel arrangement, a compressor and a heat exchanger for suction air, a cooling circuit for the diesel engine, to which circuit at least one heat exchanger is connected, during the running of the engine, suction air pressurised by the compressor is conducted to the engine by means of the air supply system of the diesel engine, the coolant flowing in the cooling circuit is cooled by a heat exchanger connected to the cooling circuit, and water is introduced into the heat exchanger to be evaporated by means of the heat exchanger to produce steam, and the steam produced in this manner is introduced into the air supply system of the diesel engine.

Preferably, some produced steam is introduced into the air supply system of the diesel engine, to a location specifically before the compressor. Thus the pressure level in this steam feeding location is relatively low, approximately equal to the ambient pressure. The water evaporation in the heat exchanger is arranged to take place preferably at a pressure of about $\leq 1$ bar. The water evaporation in the heat exchanger is controlled by conducting some of the coolant flowing in the cooling circuit to pass by the heat exchanger without delivering any heat there.

By the present invention a considerable reduction of nitrogen oxide emissions from a diesel engine is achieved by relatively small investments and operation costs. By moistening the air by steam the formation of water drops can be totally avoided, whereby the compressor is not worn for this reason. Additionally, the need to treat the water to be evaporated can be reduced to a minimum in the approach according to the invention, but this is naturally dependent on the quality of the water available.

BRIEF DESCRIPTION OF THE DRAWINGS

In the following the invention is described by way of example with reference to the attached drawing, in which.

DETAILED DESCRIPTION

Figure 1:
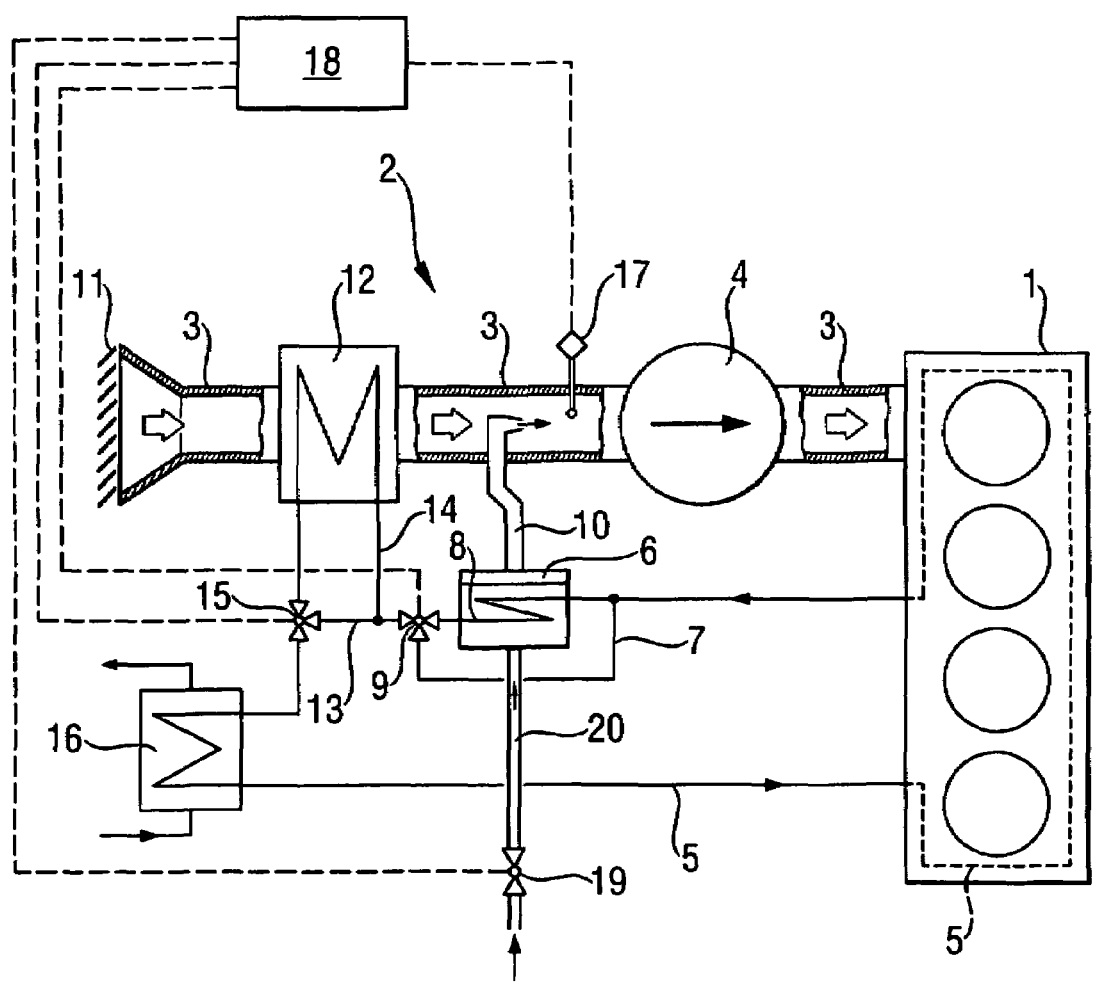
FIG. 1 shows schematically the arrangement in connection with a diesel engine.

In FIG. 1 the reference number 1 refers to a diesel engine. An air supply system 2 is arranged in connection with the diesel engine 1. The air supply system comprises a channel arrangement 3 for supplying suction air to the engine 1 from the environment. In connection with the channel arrangement 3 is provided a compressor assembly, of which only a compressor 4 is shown for the clarity of illustration. In the following the operation of the diesel engine is described as related to the present invention. In other respects the engine comprises components known per se and it operates and can be used in manners known per se.

It is generally known to cool the engine block and the other components. According to the invention heat is transferred from the cooling circuits 5 of the engine to the evaporation of water in the heat exchanger 6. In the heat exchanger 6 it is preferably possible according to the invention to maintain a pressure corresponding at most the ambient pressure.

Thus the water required for moistening the suction air of the engine may preferably be evaporated by a fluid, which is at a relatively low temperature, and also by very simple devices. According to the invention the pressure level developed in the channel arrangement 3 of the air supply system 2 being lower than the ambient pressure can be utilized for reducing also the pressure on the water side of the heat exchanger, whereby the boiling point of the water will drop. In order to make this possible the heat exchanger is connected to the air supply system 2 so that the pressure in the air supply system 2 can affect the pressure in the heat exchanger 6. Water feed pipe 20 is connected to the heat exchanger 6 for supplying water for evaporation in the heat exchanger 6. Valve 19 is provided to control the amount of water to be supplied. The arrangement and the method according to the invention can also be used when the coolant is available at a temperature of at least 100° C. Then the heat exchanger can also be used when over-pressurized, i.e. at a pressure of more than about 1 bar.

The coolant flowing from the engine 1 is conducted to the heat exchanger 6, where the water used for moistening is evaporated by means of the heat received from the coolant. The heat exchanger 6 is connected to the cooling circuit 5 of the engine so that the flow channel branches off to form two separate channels 7, 8, of which the first one 7 passes by the heat exchanger and the second one 8 goes via the heat exchanger. These are joined together by means of a valve 9 after the heat exchanger 6 to form again one flow channel. The amount of the steam to be produced can be controlled by means of the valve 9 so that the more coolant is conducted by the valve 9 to pass via the second channel 8 and the heat exchanger 6, the more intense the evaporation is. Steam feed channel 10 from the heat exchanger is arranged to extend to the channel arrangement 3 of the air supply system 2 so that it opens to a spot after the suction air filter 11 and before the compressor 4. After the valve 9 a heat exchanger 12 for suction air is connected to the cooling circuit 5. The heat exchanger 12 is connected to the cooling circuit 5 of the engine so that the flow channel branches off to form two separate channels 13, 14, of which the first one 13 passes by the heat exchanger and the second one 14 goes via the heat exchanger. These are joined together by means of a three-way valve 15 after the heat exchanger 12 to form again one flow channel. The operation of the heat exchanger 12 and the temperature of the suction air can be controlled by adjusting the valve 15. Preferably, the arrangement also comprises a heat exchanger 16, by means of which the coolant can be cooled to a temperature suitable for the cooling of the engine 1 before the coolant is introduced back to the engine 1.

The arrangement also comprises means 17 for determining the air humidity and temperature, preferably positioned before the compressor 4. These means 17 are connected to an automation system 18, which also controls the operation of the valves 9, 15 and 19. The operation of the valves 9 and is controlled on the basis of the determined humidity and temperature and the valve 19 is controlled by having the surface in the heat exchanger 6 on a desired level (not shown). The state of the suction air of the engine, as regards the humidity and temperature, is maintained on a desired level, but condensation is, however, avoided.

According to the invention the temperature of the suction air is maintained at about 35° C. and the relative humidity at about 95%, whereby the nitrogen oxide (NOx) emissions can be reduced by ca 40–50%. Additionally, it is advantageous to see that the temperature in the air chamber (not shown) of the engine itself is about 62° C.

The invention is not limited to the above-described applications, but several other modifications are conceivable in the scope of the appended claims.

What is claimed is:

1. A diesel engine comprising:
an air supply system for the diesel engine for supplying suction air to the engine from the environment, the air supply system comprising at least a channel arrangement, a compressor and a heat exchanger for suction air,
a cooling circuit for recovering waste heat from the diesel engine,
at least one engine coolant heat exchanger connected to the cooling circuit for employing heat received from the cooling circuit to evaporate water,
a water feed pipe connected to the engine coolant heat exchanger for supplying the water to be evaporated to the engine coolant heat exchanger, and
a steam feed channel connecting the engine coolant heat exchanger to the channel arrangement of the air supply system for introducing steam produced by evaporation of the water supplied by the water feed pipe into the channel arrangement,
and wherein the steam feed channel joins the channel arrangement upstream of the compressor with respect to the flow direction of the air.

2. A diesel engine according to claim 1, wherein the cooling circuit is connected to the heat exchanger for suction air at a location downstream of the engine coolant heat exchanger with respect to the flow direction of engine coolant.

3. A diesel engine according to claim 2, wherein the heat exchanger for suction air is connected to the cooling circuit of the engine so that a flow channel of the cooling circuit branches to form a first channel that bypasses the heat exchanger for suction air and a second channel that passes through the heat exchanger for suction air.

4. A diesel engine according to claim 3, comprising a three-way valve having a first port connected to the first channel, a second port connected to the second channel, and a third port connected to the cooling circuit, for controlling relative proportions of coolant passing through the first and second channels respectively.

5. A diesel engine comprising:
an air supply system for the diesel engine for supplying suction air to the engine from the environment, the air supply system comprising at least a channel arrangement, a compressor and a heat exchanger for suction air,
a cooling circuit for recovering waste heat from the diesel engine,
at least one engine coolant heat exchanger connected to the cooling circuit for employing heat received from the cooling circuit to evaporate water,
a water feed pipe connected to the engine coolant heat exchanger for supplying the water to be evaporated to the engine coolant heat exchanger, and
a steam feed channel connecting the engine coolant heat exchanger to the channel arrangement of the air supply system for introducing steam produced by evaporation of the water supplied by the water feed pipe into the channel arrangement,
and wherein the steam feed channel is arranged to transmit the effect of the pressure prevailing in the channel arrangement upstream of the compressor over to the engine coolant heat exchanger.

6. A diesel engine comprising:
an air supply system for the diesel engine for supplying suction air to the engine from the environment, the air supply system comprising at least a channel arrangement, a compressor and a heat exchanger for suction air, a cooling circuit for recovering waste heat from the diesel engine, at least one engine coolant heat exchanger connected to the cooling circuit for employing heat received from the cooling circuit to evaporate water, a water feed pipe connected to the engine coolant heat exchanger for supplying the water to be evaporated to the engine coolant heat exchanger, and a steam feed channel connecting the engine coolant heat exchanger to the channel arrangement of the air supply system for introducing steam produced by evaporation of the water supplied by the water feed pipe into the channel arrangement, and wherein the engine coolant heat exchanger is connected to the cooling circuit of the engine so that a flow channel of the cooling circuit branches to form a first channel that bypasses the engine coolant heat exchanger and a second channel that passes through the engine coolant heat exchanger.

7. A diesel engine according to claim 6, comprising a three-way valve having a first port connected to the first channel, a second port connected to the second channel, and a third port connected to the cooling circuit, for controlling relative proportions of coolant passing through the first and second channels respectively.

8. A diesel engine according to claim 6, wherein the cooling circuit is connected to the heat exchanger for suction air at a location downstream of the engine coolant heat exchanger in the flow direction of the coolant.

9. A diesel engine according to claim 8, wherein the heat exchanger for suction air is connected to the cooling circuit of the engine so that a flow channel of the cooling circuit branches to form a third channel that bypasses the heat exchanger for suction air and a fourth channel that passes through the heat exchanger for suction air.

10. A diesel engine according to claim 9, comprising a three-way valve having a first port connected to the third channel, a second port connected to the fourth channel, and a third port connected to the cooling circuit, for controlling relative proportions of coolant passing through the third and fourth channels respectively.

11. A method of operating a diesel engine comprising an air supply system, which air supply system comprises a channel arrangement, a compressor and a heat exchanger for suction air, the engine also comprising a cooling circuit for recovering waste heat from the diesel engine, to which circuit at least one heat exchanger is connected, said method comprising, during running of the engine, conducting suction air pressurized by the compressor to the engine by means of the air supply system of the engine, cooling the coolant flowing in the cooling circuit by a heat exchanger connected to the cooling circuit, introducing water into the heat exchanger to be evaporated by means of the heat exchanger in order to produce steam, introducing the steam produced in this manner into the air supply system of the diesel engine, and controlling water evaporation in the heat exchanger by directing some of the coolant flowing in the cooling circuit to bypass the heat exchanger without delivering heat in the heat exchanger.

12. A method of operating a diesel engine comprising an air supply system, which air supply system comprises a channel arrangement, a compressor and a heat exchanger for suction air, the engine also comprising a cooling circuit for recovering waste heat from the diesel engine, to which circuit at least one heat exchanger is connected, said method comprising, during running of the engine, conducting suction air pressurized by the compressor to the engine by means of the air supply system of the engine, cooling the coolant flowing in the cooling circuit by a heat exchanger connected to the cooling circuit, introducing water into the heat exchanger to be evaporated by means of the heat exchanger in order to produce steam, and introducing the steam produced in this manner into the air supply system of the diesel engine at a location upstream of the compressor with respect to the direction of flow of air.

* * * * *